US007265188B2

(12) United States Patent
Autran

(10) Patent No.: US 7,265,188 B2
(45) Date of Patent: *Sep. 4, 2007

(54) BIODEGRADABLE POLYESTER BLEND COMPOSITIONS AND METHODS OF MAKING THE SAME

(75) Inventor: Jean-Philippe Marie Autran, Wyoming, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 321 days.

This patent is subject to a terminal disclaimer.

(21) Appl. No.: 10/407,301

(22) Filed: Apr. 4, 2003

(65) Prior Publication Data

US 2003/0204028 A1    Oct. 30, 2003

Related U.S. Application Data

(63) Continuation of application No. PCT/US01/42503, filed on Oct. 5, 2001.

(60) Provisional application No. 60/238,572, filed on Oct. 6, 2000.

(51) Int. Cl.
*C08F 20/00* (2006.01)
*C08G 63/02* (2006.01)
*C08G 63/66* (2006.01)

(52) U.S. Cl. .............. 525/439; 525/450; 528/271; 528/361

(58) Field of Classification Search ........... 525/411, 525/415, 439, 450
See application file for complete search history.

(56) References Cited

U.S. PATENT DOCUMENTS 5,292,783 A * 3/1994 Buchanan et al. ............ 524/37
5,391,708 A * 2/1995 Hubbs et al. ............... 528/354
5,498,692 A * 3/1996 Noda ........................ 528/361
5,502,116 A * 3/1996 Noda ........................ 525/415
5,602,227 A * 2/1997 Noda ........................ 528/361
5,618,855 A * 4/1997 Noda ........................ 521/189
5,685,756 A * 11/1997 Noda ........................ 442/327
5,714,573 A * 2/1998 Randall et al. ............. 528/354
5,939,467 A * 8/1999 Wnuk et al. ................ 523/128
6,825,285 B2 * 11/2004 Autran et al. ............... 525/418
6,838,037 B2 * 1/2005 Autran et al. ............. 264/328.1

FOREIGN PATENT DOCUMENTS

WO    WO99/23161    5/1999

\* cited by examiner

*Primary Examiner*—Randy Gulakowski
*Assistant Examiner*—Timothy J. Kugel
(74) *Attorney, Agent, or Firm*—Armina E. Matthews; Kim William Zerby

(57) ABSTRACT

The present invention relates to tough and ductile biodegradable, aliphatic polyester blend compositions and methods for preparing such compositions. It relates to products made out of such blend compositions, including, but not limited to, films, fibers, nonwovens, sheets, coatings, binders, foams and molded products for packaging. The products exhibit a desirable combination of high strength, ductility and toughness, while maintaining flexibility, biodegradability and compostability. The products are useful for a variety of biodegradable articles, such as diaper topsheets, diaper backsheets, disposable wipes, shopping and lawn/leaf bags, agricultural films, disposable garments, medical disposables, paper coatings, biodegradable packaging, binders for cellulose fibers or synthetics, and the like.

19 Claims, No Drawings

BIODEGRADABLE POLYESTER BLEND COMPOSITIONS AND METHODS OF MAKING THE SAME

CROSS REFERENCE TO RELATED APPLICATIONS

This is a continuation of International Application PCT/US01/42503 with an international filing date of Oct. 5, 2001, published in English under PCT Article 21(2) which claims benefit of U.S. Application No. 60/238,572, filed Oct. 6, 2000.

FIELD OF THE INVENTION

The present invention is directed to tough and ductile biodegradable, compostable aliphatic polyester blend compositions and methods for preparing such compositions. It relates to products made out of such blend compositions, including, but not limited to, films, fibers, nonwovens, sheets, coatings, binders, foams and molded products for packaging. The products exhibit a desirable combination of high strength, ductility and toughness, while maintaining flexibility, biodegradability and compostability. Additional benefits of such blends are described in the invention. The products are useful for a variety of biodegradable articles, such as diaper topsheets, diaper backsheets, disposable wipes, shopping and lawn/leaf bags, agricultural films, yard waste nets, fishing nets, seeding templates, flower pots, disposable garments, medical disposables, paper coatings, biodegradable packaging, binders for cellulose fibers or synthetics, and the like.

BACKGROUND

This invention relates to the need for alleviating the growing environmental problem of excessive plastic waste that makes up an ever more important volume fraction of what get thrown out in landfills every year. In spite of their environmental awareness, consumers are unwilling to give up the attractive and unique balance of properties and cost that traditional thermoplastics offer. Thus, many of the natural polymers known to offer environmental benefits and degrade rapidly by microorganisms (e.g., cellulose, starch, etc.) have failed to provide a realistic alternative to conventional plastics because they lack their unique set of physical properties (i.e., flexibility, ductility, strength, toughness, etc.), as well as their inherent melt processibility. Therefore, there is a clear need for biodegradable, compostable polymeric thermoplastic materials that would not compromise the convenience of traditional thermoplastics as well as their flexibility, strength and toughness, yet offer alternative solutions to the issue of disposal.

The invention further relates to the need for developing new plastics materials that can be used in applications where biodegradability or compostability among others are part of the primary desirable features of such applications. Such examples include for instance agricultural films, and the convenience that such films offer to farmers when they do not have to be collected after they have served their purpose. Flower pots or seeding templates are other examples where the temporary nature of the substrate translates into convenience for the user. Means of disposal of sanitary garments, such as facial wipes, sanitary napkins, pantiliners, or even diapers, may also be broadened, as such items would advantageously be disposed directly in the sewage, after use, without disrupting current infrastructure (septic tanks or public sewage), hence avoiding handling annoyances and promoting privacy. Current plastics typically used in making such sanitary garments prevent such means of disposal without undesirable material accumulation. New materials to be used in the examples above would ideally need to exhibit many of the physical characteristics of conventional polyolefins; they must be water impermeable, tough, strong, yet soft, flexible, rattle-free, possibly low-cost and must be produced on standard polymer processing equipment in order to be cost-effective.

Another application which illustrates the direct benefit of compostable thermoplastic materials are leaf/lawn bags. Today's sole compostable bag which does not require the composter the additional burden of bag removal and the risk of compost contamination is the paper bag. Yet, it fails to provide the flexibility, the toughness and moisture-resistance of plastic films, and is more voluminous to store. Compostable plastic films used to make leaf/lawn bags would provide bags that could be disposed much like paper bags, yet provide the convenience of plastic bags.

It becomes clear in view of these examples that a combination of biodegradability, melt-processability and end-use performance is of particular interest to the development of a new class of polymers. Melt processability is key in allowing the material to be converted in films, coatings, nonwovens or molded objects by conventional processing methods. These methods include cast film and blown film extrusion of single layer structures, cast or blown film co-extrusion of multi-layer structures. Other suitable film processing methods include extrusion coating of one material on one or both sides of a compostable substrate such as another film, a non-woven fabric or a paper web. Other processing methods include traditional means of making fibers or nonwovens (melt blown, spun bounded, flash spinning), and injection or blow molding of bottles or pots. Polymer properties are essential not only in ensuring optimal product performance (flexibility, strength, ductility, toughness, thermal softening point and moisture resistance) during end-use, but also in the actual product-making stages to ensure continuous operations.

In the past, the biodegradable and physical properties of a variety of PHA's have been studied, and reported. Polyhydroxyalkanoates are semicrystalline, thermoplastic polyester compounds that can either be produced by synthetic methods or by a variety of microorganisms, such as bacteria and algae. Traditionally known bacterial PHA's include Poly(3-hydroxybutyrate), or i-PHB, the high-melting, highly crystalline, brittle, homopolymer of hydroxybutyric acid, and Poly(3-hydroxybutyrate-co-valerate), or i-PHBV, the somewhat lower crystallinity and lower melting copolymer that nonetheless suffers the same drawbacks of high crystallinity and brittleness. Their ability to biodegrade readily in the presence of microorganisms has been demonstrated in numerous instances. They however are known to be fragile polymers which tend to exhibit brittle fracture and/or tear easily under mechanical constraint, They clearly do not qualify as tough, ductile or flexible polymers. Their processability is also quite problematic, since their high melting point requires processing temperatures that contribute to their extensive thermal degradation in the melt. Other known PHA's are the so-called long side-chain PHA's, or PHO's (poly(hydroxyoctanoates)). These, unlike PHB or PHBV, are virtually amorphous owing to the recurring pentyl and higher alkyl side-chains that are regularly spaced along the backbone. When present, their crystalline fraction however has a very low melting point as well as an extremely slow crystallization rate, two major drawbacks that seriously limit their potential as useful thermoplastics for the type of applications mentioned in the field of the invention.

The use of Poly(3-hydroxybutyrate) homopolymer (i-PHB) and Poly(3-hydroxybutyrate-co-valerate) copolymer (PHBV) in blends are described in Dave et al. (Polym. Mater. Sci., 62, 231-35 (1990)) and in Verhoogt et al. (Polymer, 35(24), 5155-69, (1994)). Blending however did not readily resolve the issue of mechanical fragility and lack of flexibility of such high-crystallinity PHA's, while maintaining the biodegradable nature of these materials.

Several patents have made claims with regard to a blending approach for improving the mechanical properties of i-PHB and PHBV, with only mitigated success. Such blend compositions are excluded from this invention.

Tokiwa et al., U.S. Pat. No. 5,124,371, to AIST, Japan (see also JP 03 157450, Jul. 5, 1991), discloses a biodegradable plastic composition made of i-PHB and PCL (polycaprolactone). The optimal use of a third component, such as a copolymerization catalyst, is reported. This composition is excluded from the following patent by Hammond (see U.S. Pat. No. 5,646,217 next), the latter being aimed at expanding the concept of blending to other polymers. Tokiwa's blends of PHB with PCL as well as Hammond's blends fall short in exhibiting the ductility and toughness desired in a large variety of applications, as evidenced by the mechanical properties disclosed in their examples.

Hammond, U.S. Pat. No. 5,646,217, August 1997, to Zeneca (see also WO-A-94 11440, EP 669959 A1 and JP 08503500) discloses polymer compositions which comprise a first polyhydroxyalkanoate component and optionally a second polymer component, the compositions have enhanced properties by using an inorganic oxygen containing compound in the composition. The inorganic oxygen-containing compound may be acting as a transesterification catalyst. It is an oxy compound of a metal from group IIA, IIIA or IVA of the Periodic Table or a metalloid having a valency of at least 3 from a B group of the Periodic Table. The PHA's are said to have chemical repeating units of the following formula:

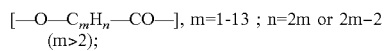

[—O—$C_mH_n$—CO—], m=1-13 ; n=2m or 2m−2 (m>2);

with specific mention of PHB and PHBV chemical structures.

In the present invention, we have unexpectedly discovered that, for the less crystalline and more ductile randomly altered PHA copolymers of lower crystallinity than i-PHB and i-PHBV, there is no need for the addition of a transesterification catalyst to achieve excellent mechanical compatibility in blends with aliphatic ester polycondensates. Moreover, such blends exhibit truly outstanding mechanical properties, especially toughness and flexibility, that are not only far superior to any disclosed in Hammond's patent, but also that can compete favorably with polyolefins, such as LLPDE (linear low density polyethylene) or i-PP (isotactic polypropylene). For instance, in all examples cited in Hammond's patent, the elongation at break of all blends fails to surpass 20% and reported toughness measurements are generally mediocre. To the contrary, our blends exhibit elongation at break values up to several 100% and toughness values that can actually surpass that of polyolefins. In addition, improvement in crystallization in the blend compositions of the present invention also far surpasses those described in Hammond's patent, and our blends can be easily processed from the melt at a lower temperature without extensive thermal degradation, making them preferred materials for high performance, disposable, biodegradable and/or compostable products.

Hammond, U.S. Pat. No. 5,550,173 to Zeneca, May 1996, (also WO 94/11445, EP 668893A1), discloses a polymer composition comprising a polyhydroxyalkanoate having a molecular weight of at least 50,000 and at least one oligomer of a polymer selected from the group consisting of polyhydroxyalkanoates, polylactide, polycaprolactone and copolymers thereof. Such oligomers have molecular weight 2,000 or less, are non-volatile and have lower Tg's that the PHA's to be modified. Oligomers are said to contribute to increase the flexibility of PHA's by lowering the Young's modulus, i.e. the modulus of elasticity. They also contribute to accelerate the biodegradation process, while being non-volatile additives. Based on the patent's data, there is no significant improvement in toughness associated with the addition of selected oligomers (see elongation at break data or Izod impact data in table 7). In addition, the disclosed oligomer structures do not include those based on ester polycondensates, one of the blend components of the present invention.

Montador et al., U.S. Pat. No. 5,516,825 to Zeneca, May 1996 (also EP655077), disclose biodegradable polyesters derived from hydroxy alkenoic acids which may be plasticized with an esterified hydroxycarboxylic acid which has at least three ester groups, at least some of the hydroxy groups being esterified with a carboxylic acid and at least some of the carboxy groups being esterified with an alcohol and/or phenol.

Along the same idea of plasticization, Hammond et al., U.S. Pat. No. 5,753,782 to Zeneca, May 1998, (also EP 701586A1, WO 94/28061) disclose polyester composition comprising a biodegradable polyester and a plasticising quantity of at least one plasticiser selected from the group: high-boiling esters of polybasic acids; phosphoric acid derivatives; phosphorous acid derivatives; phosphonic acid derivatives; substituted fatty acids; high-boiling glycols, polyglycols, polyoxyalkylenes and glycerol each optionally substituted and optionally terminally esterified; pentaerythritols and derivatives; sulphonic acid derivatives; epoxy derivatives; chlorinated paraffins; polymeric esters; Wolflex-But*; provided that citrates does not include doubly esterified hydroxycarboxylic acids having at least 3 ester groups in its molecule and further provided that glycerols does not include glycerol triacetate and glycerol diacetate. In both patents, improvement in overall mechanical properties were reported (elongation at break, impact data) along with a more significant reduction in stiffness (drop in Young's modulus). Yet, elongation at break data, for instance, remain below 100%, and Izod impact data only increase 2-4 fold. This is well below the over 10 fold toughness improvement that is typically necessary for commercial applications.

Matsushita et al, JP 08-157705 to Mitsubishi Gas & Chem. (June 1996), disclose a biodegradable resin composition comprising an aliphatic polyester prepared from a glycol, an aliphatic dicarboxylic acid or its derivative and poly-3-hydroxybutyrate. It is desirable that the poly-3-hydroxybutyrate has a weight-average molecular weight of 400 k g/mole or above. If it has a molecular weight below that, it reportedly cannot give a satisfactory molding The purpose was to obtain a biodegradable resin composition excellent in moldability, mechanical properties and heat resistance by mixing a specified aliphatic polyester with poly-3-hydroxybutyrate. Blends of i-PHB, the homopolymer of hydroxybutyric acid, with polycondensates of glycol and aliphatic dicarboxylic acid are excluded from the present invention, by restricting the definition of PHA's to copolymers of reduced crystallinity and greater ductility and flexibility.

Similarly, Miura et al, JP 8027362A to Mitsubishi Gas and Chem. (January 1996), disclose a composition comprising desirably 99-50 pts.wt. aliphatic polyester carbonate obtained by condensing an aliphatic dibasic acid, desirably succinic acid, with an aliphatic dihydroxy compound, desirably 1,4-butanediol, and a diaryl carbonate (e.g. diphenyl carbonate) and desirably 1-50 pt wt. poly-beta-hydroxybutyric acid. Again, blends containing the stiffest and most brittle member of the PHA family, i.e. i-PHB and PHBV, are excluded from the present invention.

Dabi et al., EP 606923A2 and EP 882765A2, January '1994 to McNeil-PPC, Inc., disclose two classes of thermoplastic biodegradable compositions that are said to exhibit good mechanical properties and readily degrade in the presence of microorganisms. One aspect of the invention discloses biodegradable compositions based on destructurized starch-polymer alloys that are out of the scope of the present invention. Another aspect of the invention provides blends of a thermoplastic and ester containing polymer, a plasticizer and optionally an inert filler. More specifically, these compositions are described as comprising:

10 to 70 wt % polymers or copolymers comprising one or more repeating units of the general formula:

(~R=1 to 9 carbon-containing alkyl groups);

5 to 35 wt % ester-containing polymers, of molecular weight greater than 10,000 and selected from the group consisting of:

Polymers with ester linkages in the backbone, of the following type;

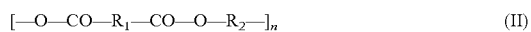

Polymers with pendant ester groups, of the following type:

and

0 to about 30 wt % of one or more plasticizers, such as triacetin;

0 to about 50 wt % of an inert filler, such as calcium carbonate or starch;

Examples that illustrate such compositions include PHBV (commercially available Biopol) blended with either PCL (polycaprolactone) or EVA (ethylene-vinylacetate copolymer). Both polymers are outside the scope of the present invention. The mechanical properties achieved, although better than for pure PHBV, fail to be outstanding and would be unlikely to compete with polyolefins, whether on toughness or flexibility, based upon the available data. Only in very limited cases did the elongation at break of the blends surpass 100%; and in no instance was 300% elongation reached. In fact, in the 70/30 blend of PHBV and PCL without additives, the reported elongation at break of 15% is indicative of brittle fracture (no ductility).

Polybutylene succinate or polybutylene succinate-co-adipate, the most preferred embodiments of the present invention with regard to the type of ester polycondensates to be blended with our PHA copolymers (see the detailed description of the invention further below) is neither cited in the patent nor is it used in examples.

Hence, the authors of the above invention fail to recognize and establish how the novel PHAs of the present invention and which differ from PHB or PHBV in both their chemical structure and mechanical performance, are capable of achieving truly discontinuous outstanding mechanical properties in blends with ester polycondensates such as polybutylene succinate or polybutylene succinate-co-adipate. Performance-wise, the surprising result is that such blends capable of surpassing not only those of similar blends with conventional PHA's like PHB or PHBV, but also those of common ductile polyolefins such as polyethylene or polypropylene, as illustrated in the examples below. In addition, blends of the present invention compete favorably in terms of their ability to undergo rapid biodegradation, and can be easily processed, making them preferred materials for high performance, disposable products.

Tsai et al., World Patent Application No WO 98/29493 to Kimberly-Clark (July 1998) disclose a thermoplastic composition that comprises a unreacted mixture of an aliphatic polyester polymer and a multicarboxylic acid. One example of such a thermoplastic composition is a mixture of poly (lactic acid) and adipic acid. The thermoplastic composition is capable of being extruded into fibers that may be formed into nonwoven structures that may be used in a disposable absorbent product intended for the absorption of fluids such as body fluids. The second claim discloses a composition made of a variety of aliphatic ester polymers, and mixtures thereof, as well as copolymers of such polymers. Bionolle and PHBV are among the polymers listed, their blend being outside the scope of the present invention. Other less crystalline and more flexible PHA's are not cited.

Wu et al., U.S. Pat. No. 5,200,247 June 1992 (also EP 882765) to Clopay Plastics Prod. Co., disclose a biodegradable thermoplastic film comprising a blend of an alkanoyl polymer and poly(vinyl alcohol). The film can be stretched providing opacity and enhancing its biodegradability. The alkanoyl thermoplastic polymer, which is said to make up 90-75 wt % of the blend, selected form the group consisting of:

a) dialkanoyl polymer (at least 10% of recurring dialkanoyl units), b) oxyalkanoyl of formula $O(CH_2)_xC=O$ (x=2-7), and mixtures thereof.

The above definition does not include the specific PHA copolymers of the present invention, and in its most preferred embodiment, the oxyalkanoyl polymer is PCL, (i.e. polycaprolactone). There is no specific claim of film performance beyond the fact that the film must be ductile in order to be stretchable.

Matsumura et al, U.S. Pat. No. 5,464,689 to Unicharm Corp. November 1995 (also EP 0 629 662B1 and JP7003138), disclose a resin composition which comprises 40 to 85% PHBV (8-15% V); 60 to 15% PCL and 5-40 vol. % of inorganic filler (part. size of 0.1 to 10 micron), and porous films produced from the composition by a disclosed stretching process. The authors claim that porous film to be easily my microorganisms. Such biodegradable polyester blends are outside the range of materials and compositions included in the present invention.

Kleinke et al., U.S. Pat. No. 5,231,148, to PCD Polymere Gesellschaft (November 1991), disclose mixtures comprising at least 70% by weight of a polyhydroxyalkanoate and 0.1 to 10% by weight of a compound or a mixture of compounds which contain at least two acid and/or alcohol groups, which are melted or softened and/or dissolved in a melt of said polyhydroxyalkanoate and/or are miscible with the melt at the melting point of said polyhydroxyalkanoate, mixtures of poly-D(−)-3-hydroxybutyric acid with a polyether being excluded. The ester polycondensates of the present invention are generally neither soluble nor miscible with the PHA's copolymers, and there is no clear evidence of chemical reactions taking place.

Yoon et al, J. Poly. Sci., Pol. Phys., 34, pp 2543-2551 (1996) have examined compatibility and biodegradability aspects of blends of i-PHB with an aliphatic terpolyester of adipic acid, ethylene glycol and lactic acid. They determine that such polymers were considered compatible from structural studies, yet did not observe any chemical changes such as transesterification as a result of blending.

Kumagai et al., Polymer Degradation and Stability, 36, p. 241 (1992) disclose blends of poly(3-hydroxybutyrate) with either poly(□-caprolactone), poly(1,4-butylene adipate) or poly(vinyl acetate). In the first two cases, blends are found to be immiscible, whereas miscibility was observed in blends of the third kind. In a parallel study, Kumagai et al., Polymer Degradation and Stability, 37, p. 253 (1992), disclose blends of poly(3-hydroxybutyrate) with poly(b-propiolactone), poly(ehtylene adipate) or poly(3-hydroxybutyrate-co-valerate) with high HV content. The authors disclose that rates of enzymatic degradation of films formed from the blends are higher than the rate of each polymer component film.

Wnuk et al., World Patent Applications Nos. WO 96/08535 and WO 97/34953, disclose general compositions comprising blends of biodegradable polymers, and exemplify polymer compositions comprising a biodegradable polyhydroxyalkanoate and a second biodegradable polymer selected from the group consisting of aliphatic polyester-based polyurethanes, polylactides, polycaprolactone and mixtures thereof. The aliphatic polyester-based polyurethanes referred to above are low crystallinity, thermoplastic elastomer-like grade that differ from the semicrystalline polyesters of the present invention that contain a majority of aliphatic dialkanoyl recurring units. In particular, such polyurethanes cannot contribute to an increase in crystallization rate similar to that described in one of the examples of the present invention. Also, there is no differentiation made between the low performance of blends made using conventional, highly crystalline, brittle PHA's (such as PHB of PHBV) and the much greater ductility and toughness of blends of the present invention that comprise lower crystallinity PHA's.

Finally, with regard to polyester blends, Hubbs et al., World Patent Application No WO 94/00506 to Eastman Kodak, disclose a variety of blends of PHA's with other polyesters, including aliphatic ester polycondensates. The PHA's disclosed are made solely by chemical synthesis only and are atactic in nature, i.e. with no optical activity, hence exhibiting little or no crystallinity. They differ from the PHA's of the present invention, which are either fully isotactic, i.e. optically pure, when made via biosynthesis, or largely isotactic (97%) when specific catalysts such as alkylzinc alkoxides are used to polymerize b-substituted b-propiolactones (see U.S. Pat. No. 5,648,452, L. A. Schechtman et al., assigned to the Procter and Gamble Co.).

Recently, new poly(3-hydroxyalkanoate) copolymer compositions have been disclosed by Kaneka (U.S. Pat. No. 5,292,860), Showa Denko (EP 440165A2, EP 466050A1), Mitsubishi (U.S. Pat. No. 4,876,331) and Procter & Gamble (U.S. Pat. Nos. 5,498,692; 5,536,564; 5,602,227; 5,685, 756). All describe various approaches of tailoring the crystallinity and melting point of PHA's to any desirable lower value than in the high-crystallinity PHV or PHBV by randomly incorporating controlled amounts of "defects" along the backbone that partially impede the crystallization process. Such "defects" are either, or a combination of, branches of different types (3-hydroxyhexanoate and higher) and shorter (3HP, 3-hydroxypropionate) or longer (4HB, 4-hydroxybutyrate) linear aliphatic flexible spacers. The results are copolymer structures that undergo melting in the most useful range of 80° C. to 150° C. and that are less susceptible to thermally degrade during processing. In addition, the biodegradation rate of these new copolymers is typically improved as a result of their lower crystallinity and the greater susceptibility to microorganisms. Yet, whereas the mechanical properties of such copolymers are improved over that of PHB or PHBV, their toughness remains inferior to that of polyolefins as for instance after prolonged physical aging. Aging is responsible for the stiffening of these copolymers, which further affect their ductility, i.e. their ability to undergo large-scale plastic deformation without undergoing failure. It mimics the aging effect reported for PHB and PHBV by G. J. M. deKoninck et al, although to a lesser extent. In World Patent Application WO 94/17121, the latter disclose a thermal annealing treatment capable of partially reversing the aging effect which nevertheless falls short of bringing in sufficient ductility in these high-crystallinity polymers. Finally, the rate of crystallization of the new, more suitable, copolymers is characteristically slow and remains a challenge for them to be processed by conventional converting methods.

Despite all these advances in designing more useful PHA copolymers and the like, there still remains a challenge to find a class of materials that exhibits the outstanding polyolefin-like properties (e.g., flexibility, ductility, toughness, water-impermeability) that have come to be expected from thermoplastics, a high rate of biodegradation which opens up alternative approaches to disposal beyond landfill, and processing characteristics that allow them to be easily handled on conventional converting equipment without major transformation. The present invention provides novel compositions which have been found to offer a useful balance of mechanical properties, high biodegradation rate and ease of processability.

OBJECTS OF THE INVENTION

Accordingly, it is an object of the present invention to provide biodegradable polyhydroxyalkanoate-based compositions and methods which overcome disadvantages or limitations of the prior art.

It is an object of the present invention to provide novel flexible, extremely tough and strong, water-impermeable, easily melt-processible and biodegradable polymer compositions that maintain their integrity over the widest range of temperature encountered in the types of applications disclosed below. In its general sense, biodegradable means that the polymeric component is susceptible to being assimilated by microorganisms over time when buried in the ground or disposed in the sewage, or otherwise contacted with the organisms under conditions conducive to their growth. The material eventually biodegrades to $CO_2$, $H_2O$ and biomass in the environment, much like other known natural biodegradable matter such as starch or cellulose.

It is also an object of this invention to provide immiscible, yet mechanically compatible polymer blends that exhibit excellent mechanical integrity without the need for compatibilizers or catalysts, and can readily biodegrade in many environments.

It is another object of this invention to provide a method for dramatically enhancing the ductility and toughness of biodegradable poly(hydroxyalkanoates) copolymers, hence triggering the usefulness of these new materials in a wide range of applications.

It is yet another object of this invention to provide strong, ductile biodegradable polymer substrates that can be transformed in the solid-state by known stretching processes without breaking, the resultant transformed substrates exhibiting even higher mechanical properties than the original ones (enhanced toughness, partial elastic recovery).

It is yet another object of this invention to provide biodegradable polymer compositions which exhibit improved melt rheology and crystallization rate and which are readily melt-processable into a variety of plastic articles.

It is yet another object of this invention to provide a method of using a biodegradable polymer composition to make plastic articles, using conventional converting processes, such as melt or solvent spinning, melt blowing, cast film extrusion or blown film extrusion, injection molding or solvent coating.

It is an additional object of this invention to provide tough, strong, yet flexible biodegradable sanitary and medical garments, compostable plastic bags and agricultural films, injection-molded pots, yard-waste nets, compostable foamed articles, biodegradable pulp, paper coatings as well as binders.

It is an additional object of the invention to provide novel absorbents articles with biodegradable compostable backsheets or other structural features of the articles, which may be disposed by a greater variety of means, including via the sewage.

SUMMARY OF THE INVENTION

The first aspect of the present invention relates to novel biodegradable, compostable thermoplastic polymer compositions that exhibit, flexibility, ductility and toughness characteristics that compete favorably with that of most common ductile polyolefins such as polyethylene and polypropylene, can be easily solid-state-, melt- or solution-processed into a variety of shaped articles, yet can easily degrade or breakdown in the presence of microorganisms. Such compositions comprise at least two polymer components;

a) wherein the first component, which comprises between 20 to 80 wt % of the novel composition, is a polyhydroxyalkanoate copolymer, or a blend thereof, comprising at least two randomly repeating monomer units (RRMUs); wherein the first RRMU, which comprises at least 50% of the polyhydroxyalkanoate monomer units, has the following generic structure (I):

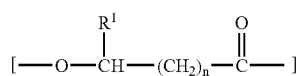

(I)

The second RRMU included in the biodegradable polyhydroxyalkanoate copolymer comprises at least one monomer selected from the group consisting of the structures (II) and (III):

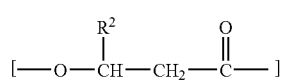

(II)

wherein $R^2$ is a C3-C19 alkyl or C3-C19 alkenyl, and

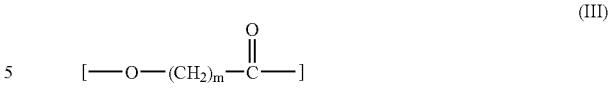

(III)

wherein m is from 2 to about 16 b) wherein the second component which comprises between 80 to 20 wt % of the novel composition is an ester polycondensate, or a blend thereof, resulting from the polycondensation of aliphatic dialkanoyl units of the generic structure:

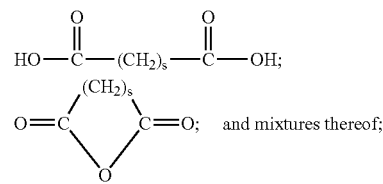

wherein s is from about 1 to about 10, preferably from about 2 to 10, and a dihydric alcohol having the formula:

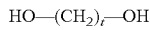

wherein t is from about 2 to about 10. Alternatively, up to 50% of the aliphatic diacids of the polycondensate may be replaced by aromatic ones, such as terephthalic or naphthalic acids of the following formula:

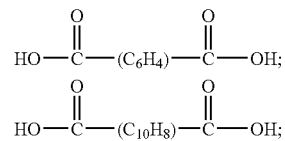

In order to obtain an advantageous combination of physical properties while maintaining the biodegradability of the polyhydroxyalkanoate copolymer, at least about 50 mole % of the copolymer comprises RRMUs having the structure of the first RRMU of formula (I). Suitably, the polyhydroxyalkanoate copolymer suitably has a number average molecular weight of greater than about 150,000 g/mole.

In further embodiments of the polyhydroxyalkanoate copolymer employed in the compositions, one or more additional RRMUs may be included. Suitably, the additional RRMUs may have the structure (IV):

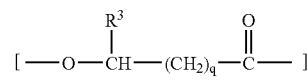

(IV)

wherein $R^3$ is H, or a C1-C19 alkyl or alkenyl group and q is 1 or 2, with the provision that the additional RRMUs are not the same as the first or second RRMUs, and that $R^3$ is not C2H5 if $R^1$ is CH3.

More than two polymer components may be present in the polymer composition, in which case the additional polymer compositions follow the chemical structures depicted in a) and b) and meet the overall polymer compositions defined above.

Optionally, the blend compositions of the present invention may comprise between 0 and 20% by weight of one or more compatible plasticizers with the idea of further tailoring flexibility and broaden its temperature range of usefulness. Also, the blend compositions of the present invention may include one or several additional compatible polymers, as long as the latter remains below 10% by weight of the total polymer content. The polymers may in particular include the polyhydroxybutyrate homopolymer (iPHB), or polyhydroxybutyrate-co-valerate (PHBV), which may be produced in small quantities by the same biological organisms responsible for the production of the lower crystallinity PHA copolymers of the present invention.

In accordance with another aspect of this invention, the present invention further relates to methods of preparing the novel biodegradable, compostable thermoplastic polymer compositions, including blending the blend components in solution or in the melt, followed by solvent removal or simply cooling down.

The present invention further relates to a method of toughening PHA's, by finely dispersing a thermoplastic ester polycondensate, comprising at least 50% of aliphatic dialkanoyl units so as to improve its toughness and ductility.

The present invention further relates to the fabrication of biodegradable plastic articles by processing and converting the polymer composition of the present invention from solution or the melt into shaped articles which can be virtually free of catalysts or compatibilizers. Such plastic articles include films, sheet, fibers, coatings, molded articles, non-woven fabrics and foamed articles.

The present invention further relates to the fabrication of biodegradable sanitary and/or medical garments, that include sanitary napkins, wipes, diapers, panty-liners and the like, as well as compostable bags such as leaf/lawn bags, agricultural films, fishing nets, yard waste nets and seeding templates, foamed articles such as disposable cups, and coated or bound pulp or paper-based products, using the high strength and toughness blend compositions of the present invention.

PHA's are known for their high biodegradation rate in most environmental conditions typically encountered (aerobic and anaerobic), owing to their intrinsic enzymatic nature as well as their lower crystallinity. This makes them desirable components in blends with other biodegradable polyesters, as they contribute to promote the blends' biodegradability and expand the means by which they may be disposed of. As a result, the blend exhibit outstanding mechanical integrity and strength during use, including under wet conditions, yet they easily break down in most encountered environments, over a fairly short amount of time.

Bags are typically single- or multi-layer structures that are made by sealing and pre-cutting a continuously blown film at regular intervals. The processability and film performance aspects of the blend compositions of this invention are unique in providing a valuable alternative to the traditional bags made out of polyolefins.

It has now being found that the ductility of articles fabricated from polyhydroxyalkanoates can be surprisingly improved by the simple addition of ester polycondensates prior to blending and conversion into various articles. The polyhydroxyalkanoate and aliphatic ester polycondensate blend results in a biodegradable, compostable plastic composition with remarkable mechanical strength and toughness, high biodegradation rate, ease of processability and potentially low cost. The latter point is supported by the fact that both PHA's and ester polycondensates, such as polybutylene succinate for instance, are largely based upon C4 chemistry and can in principle be derived from commodity renewable resources, via bacterial synthesis or fermentation followed by polycondensation reactions.

DETAILED DESCRIPTION

Physical Characteristics of the Blends:

The applicant has found that semi-crystalline linear aliphatic polyester blends comprising biodegradable polyhydroxyalkanoates (PHA's) and aliphatic ester polycondensates (AEP's) such as the ones described in Example 1 can be successfully prepared. These polyesters generally form immiscible blends. As used herein, "immiscible [polyester] blends" refers to blends which exhibit multiple glass transitions and/or melting points, when studied by Scanning Differential Calorimetry (DSC). Mixing is easily achieved either in solution in a common solvent, or in the melt, at temperatures above both melting points. Yet it is important to avoid that the temperature of the melt be raised above 150 to 160° C., where thermal degradation of the PHA copolymer can be triggered. A detailed description of the blend components is provided later in the description of the invention.

The polyesters of the present invention generally form immiscible blends. Yet, unlike most immiscible blends which have poor mechanical integrity, the blends of the present invention are unexpectedly found to exhibit excellent mechanical properties. In fact, they display a very large improvement in toughness and ductility over materials made solely out of PHA's, therefore making them preferable materials in a variety of applications. This is illustrated in Examples 2 & 3 using experimental fracture toughness data obtained on such film samples. Two different testing methods are described in the examples, to demonstrate the high toughness of the particular materials tested. Such immiscible, yet "compatible", blends exhibit a synergistic behavior in at least one mechanical property, as compare to the individual components of the blends. For instance, films formed with the polyester blends exhibit much greater toughness that would be expected from the single blend component. One benefit of the higher performance of these materials is that it allows either to make disposable articles with improved toughness if necessary as in the case of a high-performance lawn/leaf bag, or to down-gauge the polymeric components of the article to be made, hence resulting in an overall material reduction. The latter can contribute to reducing cost and benefiting the environment, while making the article more easily and rapidly biodegradable.

As a result of the enhancement in ductility, such materials can easily be subjected to solid state transformation processes that involves stretching and extension of the material, whether uniformly or incrementally, without undergoing premature failure. As used herein, "ductility" refers to the ability of the article to deform and dissipate mechanical energy internally, without undergoing failure. As used herein, "failure" is intended to refer to the tendency for an article to fracture or tear. For example, a ductile plastic film is a film which, when under mechanical stress, stretches and deforms rather than, or at least prior to, failing. The greater the ductility, the more the material is able to accommodate to the stress applied without breaking. Polyolefins are known for their ductility, and this characteristic has been exploited to a large extent to transform polyolefin articles into ever more useful and functional objects. It is therefore very desirable to develop biodegradable polyesters blends which compare with, or even surpass, polyolefins. This attribute of blend compositions of the present invention is well illustrated in Example 4.

Furthermore, the mechanical properties of blends that have been subjected to solid-state transformation are unexpectedly found to exhibit an even greater toughness than the unstretched specimens. This is illustrated in Example 5. Once again, the opportunity is such that it can lead to an overall increase of the performance of the article that utilizes the material, it can also lead to further material reduction, without any performance penalty. This is for instance illustrated in the case of a lawn/leaf bag which is subjected to an incremental stretching process such as SELFing and which results in a potential increase in capacity of the bag at equal or even better puncture resistance. One important result of this key-finding: the more you load your bag, the greater its capacity and the larger its ability to resist tear and puncture! Additional functionality may be introduced in the polymeric bag via an pre-stretching process, such as a certain amount of recoverable elasticity, as exemplified in Example 6. Such an elasticity offers an entry point to the one-size-fits-all concept for compostable bags. If only incrementally or partially pre-drawn, the residual ductility or plasticity left in such a film can be used to impart additional changes in size or shape, without risking early fracture of the film owing to its very high puncture and tear resistance.

PHA's are generally fairly slow to crystallize, as a result of their intrinsically slow crystal nucleation and crystal growth. Technical leads for speeding up crystallization are required for these polymers to become processable at speeds comparable to other common polymers and into the various objects of the present invention. High-efficiency nucleant packages are certainly needed in order to circumvent their intrinsically slow crystallization. Several of those already described in the literature may be found to qualify. Others will be the subject of other inventions. At any rate, ester polycondensates are found to also contribute to accelerating the crystallization of PHA's in blends, as illustrated in Example 7. The applicant data show that this is not only the result of the fact that the ester polycondensate fraction of the blend crystalllizes faster; the PHA fraction of the blend also does. And as a result, there is an overall benefit with that regard and in the improved ability to convert blends of the present invention into various forms, at faster rates, i.e. with better economics.

As a result of the immiscibility of the blends, the polymer components phase-separate and as a result their respective thermal transitions influence the blends as a whole. Examples of how this can induce a widening of the temperature range over which these materials are useful in articles are provided in Example 8. It is generally understood that semicrystalline polymers are most useful in the interval between Tg and Tm. Below Tg, they become more easily prone to brittle fracture and are often considered fragile; Above Tm, they loose their physical integrity. The blends described above can help take advantage of the lower Tg of the ester polycondernsates as well as of the higher Tm of the polyhydroxyalkanoates as a means of widening the span of usefulness of these materials.

Most of the melt processing of polymers in general takes advantage of two important characteristics of these materials: melt elasticity and shear-thinning behavior. As used herein, "melt elasticity" describes the ability of the polymer melt to maintain a stable transient shape upon processing, i.e. to exhibit some reasonable mechanical integrity in the melt. This provides tremendous flexibility in shaping up or thinning out a polymer in the melt before it cools down and solidifies. At equal molecular weight, the melt elasticity of the PHA copolymers is much lower than that of the ester polycondensates, which has been attributed to the higher molecular weight between entanglements in the latter. As a result, even higher molecular weights are necessary for PHA's to exhibit sufficient melt elasticity. In blends, the ester polycondensate component contributes to building the melt elasticity, hence relaxes the requirement for having high molecular weight PHA (see Example 9). Another valuable feature typical of polymers is their ability to exhibit shear thinning behavior during processing. As used herein, "shear thinning" describes the lowering of the shear viscosity of the polymer in the melt under flow, hence reducing its viscosity and making it easier for the material to be processed. As demonstrated in Example 9 in a blend composition of the present invention, shear thinning is more pronounced in the blend than it would be for PHA's alone The blends of the present invention are referred to as being biodegradable. As used herein, "biodegradable" refers to the ability of a compound to ultimately be degraded completely into $CO_2$ and water or biomass by microorganisms and/or natural environmental factors. The blends of the present invention meet the requirement of the recently adopted US ASTM standard for compostable plastics (ASTM D6400-99) which is consistent with the German DIN as well the upcoming European (CEN) one, which along with the development of a certification/logo aimed at certifying products that conform to the ASTM standard for biodegradability is expected to help identify truly biodegradable materials.

PHA's of the present invention are known to be quite readily broken down and mineralized by microorganisms, independent of their composition. Ester polycondensates are also known to break down over time, and eventually be largely metabolized by microorganisms. Some of the commercially available polyesters have successfully met the criteria established by the ASTM standard. If aromatic monomers are present, it is essential that the ratio of aromatic constituents over aliphatic ones remains below a critical value in order to ensure that there are no large enough aromatic oligomeric residues that may not be readily metabolized.

All copolymer composition ratios recited herein refer to molar ratios, unless specifically indicated otherwise. All percentages are by weight, unless specifically indicated otherwise.

Polyhydroxyalkanoates

The polyhydroxyalkanoates used in the blends of the present invention made be synthetically prepared, or may be produced by a variety of biological organisms, such as bacteria or algae. The polyhydroxyalkanoates are copolymers, preferably the polyhydroxyalkanoates are copolymers with two or more constituents.

The polyhydroxyalkanoates may be substantially optically pure, i.e mainly isotactic or syndiotactic. The polyhydroxyalkanoates used herein are preferably substantially isotactic (from about 90% to about 100%, by weight, isotactic) or fully isotactic (about 100%, by weight, isotactic). The fully isotactic polyhydroxyalkanoates may be obtained from biological organisms, preferably polyhydroxyalkanoates used herein are obtained from biological organisms by fermentation or from transgenic green plants (eukaryotes).

The polyhydroxyalkanoate copolymer, or a blend thereof, comprises at least two randomly repeating monomer units (RRMUs); wherein the first RRMU, which comprises at least 50% of the polyhydroxyalkanoate monomer units, has the following generic structure (I):

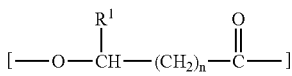
(I)

wherein $R^1$ is H, or C1 or C2 alkyl, and n is 1 or 2. In a preferred embodiment, $R^1$ is a methyl group ($CH_3$), whereby the first RRMU has the structure:

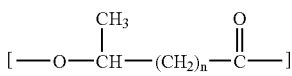

wherein n is 1 or 2. In a further preferred embodiment of the first RRMU, $R^1$ is methyl and n is 1, whereby the polyhydroxyalkanoate copolymer comprises 3-hydroxybutyrate units. The second RRMU included in the biodegradable polyhydroxyalkanoate copolymer comprises at least one monomer selected from the group consisting of the structures (II) and (III):

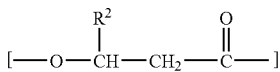
(II)

wherein $R^2$ is a C3-C19 alkyl or C3-C19 alkenyl, and

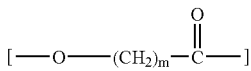
(III)

wherein m is from 2 to about 16. Generally, in the RRMU of formula (II), the length of $R^2$ will, to some extent, influence the reduction in overall crystallinity of the copolymer. In a preferred embodiment, $R^2$ is a C3-C10 alkyl group or alkenyl group. In a further preferred embodiment, $R^2$ is a C3-C6 alkyl group, and in a further preferred embodiment, $R^2$ is a C3 alkyl group, whereby the second RRMU is 3-hydroxyhexanoate. In alternately preferred embodiments, $R^2$ is a C10-C19 alkyl or alkenyl group. With reference to the second RRMU comprising a monomer of structure (III), in a preferred embodiment, m is from 2 to about 10, and more preferably is either 4 or 5. In further embodiments, the biodegradable polyhydroxyalkanoate copolymer comprises the first RRMU of structure (I) and additional RRMUs of both structure (II) and structure (III). In order to obtain an advantageous combination of physical properties while maintaining the biodegradability of the polyhydroxyalkanoate copolymer, at least about 50 mole % of the copolymer comprises RRMUs having the structure of the first RRMU of formula (I). Suitably, the molar ratio of the first RRMUs to the second RRMUs in the copolymer is in the range of from about 50:50 to about 99:1. When a blend of the present invention is processed into a normal fiber or molded article (e.g., injected or blow molded), preferably from about 80% to about 99.5%, more preferably from about 90% to about 99.5%, even more preferably from about 95% to about 99.5%, of the blend RRMUs of the PHA have the structure of the first RRMU. When a blend of the present invention is processed into an elastomer or an adhesive, preferably about 50% of the RRMUs of the PHA have the structure of the first RRMU. When a blend of the present invention is processed into a nonwoven fabric, preferably from about 85% to about 99.5%, more preferably from about 90% to about 99.5%, even more preferably from about 95% to about 99.5%, of the RRMUs of the PHA have the structure of the first RRMU. While not intending to be bound by theory, it is believed that the combination of the second RRMU chain and/or branch lengths and the indicated molar amounts sufficiently decrease the crystallinity of the first RRMU to form the copolymer with desired physical properties for the intended application.

In addition, the molecular weight of the polyhydroxyalkanoate is preferably greater than about 150,000, more preferably from about 150,000 to about 2,000,000, even more preferably from about 250,000 to about 1,000,000.

In further embodiments of the polyhydroxyalkanoate copolymer employed in the compositions, one or more additional RRMUs may be included. Suitably, the additional RRMUs may have the structure (IV):

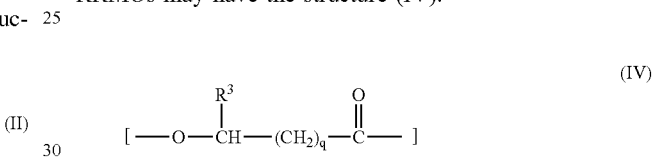

wherein $R^3$ is H, or a C1-C19 alkyl or alkenyl group and q is 1 or 2, with the provision that the additional RRMUs are not the same as the first or second RRMUs, and that the $R^3$ is not $C_2H_5$ if $R^1$ is CH3.

Suitable polyhydroxyalkanoates include those disclosed in Noda, U.S. Pat. Nos. 5,498,692; 5,502,116; 5,536,564; 5,602,227; 5,618,855; 5,685,756; and 5,747,584, as well as other poly(3-hydroxyalkanoate) copolymer compositions disclosed by KaneKa (U.S. Pat. No. 5,292,860), Showa Denko (EP 440165A2, EP 466050A1), Mitsubishi (U.S. Pat. No. 4,876,331), incorporated herein by reference.

Aliphatic Ester Polycondensates

The aliphatic ester polycondensates used in the present invention are synthesized from an aliphatic polyhydric alcohol and an aliphatic polycarboxylic acid compound. As used herein, "polyhydric alcohol" refers to alcohol having at least 2 hydroxy groups, while "polycarboxylic acid compounds" refer to compounds having at least 2 groups selected from carboxylic acid groups and acid derivative groups, including acid anhydrides and acid halides. Preferably the molar ratio of the polyhydric alcohol to the aliphatic polycarboxylic acid compound is from about 1.05:1 to about 1.2:1.

Preferably the polyhydric alcohol is a dihydric alcohol. Suitable dihydric alcohols include ethylene glycol, propylene glycol, 1,4-butanediol, 1,6-hexanediol, nonamethylene glycol, decamethylene glycol, 1,3-butanediol, 3-methyl-lis-pentane, neopentyl glycol, 2-methyl-1,3-propanediol, 1,4-cyclohexanedimethanol, and mixtures thereof.

Preferred dihydric alcohols have straight chain alkylene groups with even number carbons, more preferred dihydric alcohols have 2, 4, 6, 8 or 10 carbon atoms. Even more preferably, the dihydric alcohol is selected from the group consisting of ethylene glycol, 1,4-butanediol and 1,4-cyclohexanedimethanol and mixtures thereof.

Suitable aliphatic polycarboxylic acid compounds include aliphatic polycarboxylic acids, aliphatic polycarboxylic acid anhydrides, aliphatic polycarboxylic acid halides and mixtures thereof. Preferably the aliphatic polycarboxylic acid compound is an aliphatic dicarboxylic acid compound, more preferably an aliphatic dicarboxylic acid or an aliphatic dicarboxylic acid anhydride. Suitable polycarboxylic acid compounds include succinic acid, succinic anhydride, adipic acid, adipic anhydride, suberic acid, sebacic acid, dodecadinoic acid, cyclohexanedicarboxylic acid and mixtures thereof.

Preferred aliphatic dicarboxylic acid compounds have straight chain alkylene groups with even number carbons, more preferred aliphatic dicarboxylic acid compounds have 2, 4, 6, 8 or 10 carbon atoms. Even more preferably, the dicarboxylic acid is selected from the group consisting of succinic acid, succinic anhydride, adipic acid, suberic acid, sebacic acid, dodecadinoic acid and mixtures thereof. Preferably the aliphatic polycarboxylic acid compound comprises at least 70 mol %, preferably at least 90 mol %, of an acid compound selected from the group consisting of succinic acid, succinic anhydride and mixtures thereof. Preferably the aliphatic polycarboxylic acid compound comprises no more than about 30%, preferably no more than about 10%, of acid compounds other than succinic acid and/or succinic anhydride. Preferably the molar ratio of succinic acid and/or anhydride to other aliphatic polycarboxylic acid compounds is from about 70:30 to about 100:0.

The aliphatic ester polycondensate may be synthesized from a dicarboxylic acid compound selected from the group consisting of compounds having the formula:

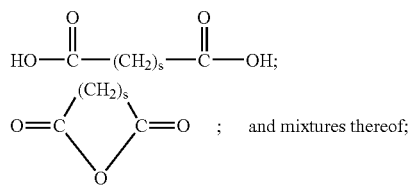

wherein s is from about 1 to about 10, preferably from about 2 to 10, and a dihydric alcohol having the formula:

wherein t is from about 2 to about 10.

The aliphatic ester polycondensates may be prepared from preferred ingredient mixtures such as ethylene glycol and succinic acid or its anhydride; 1,4-butanediol and succinic acid or its anhydride; 1,4-butanediol, succinic acid or its anhydride and adipic acid or its anhydride; 1,4-butanediol, succinic acid and sebacic acid; 1,4-cyclohexanedimethanol and adipic acid; and 1,4-cyclohexanedimethanol and sebacic acid. More preferred are mixtures of ethylene glycol and succinic acid or its anhydride; 1,4-butanediol and succinic acid or its anhydride; and 1,4-butanediol, succinic acid or its anhydride and adipic acid or its anhydride.

The aliphatic ester polycondensate may include some aromatic ester components incorporated either in random or in small blocks as long as the content of aromatic ester remains below 50%. The polycondensate may also include monomeric or polymeric sequences of PHA's as defined above. When urethane bonds are contained in the aliphatic ester polycondensate, the amount of urethane bonds is 0.03-3.0% by weight, preferably 0.05-2.0% by weight, and more preferably 0.1-1.0% by weight, of the aliphatic ester polycondensate. This generally serves as a means of increasing the molecular weight of the chains.

Preferably the molecular weight of the polycondensate is greater than about 20,000, more preferably from about 50,000 to about 500,000, even more preferably from about 100,000 to about 400,000.

Suitable aliphatic ester polycondensates include those disclosed in Takahashi et al., U.S. Pat. No. 5,525,409; Takiyama et al., U.S. Pat. No. 5,310,782, and Imaizumi et al., U.S. Pat. Nos. 5,314,969 and 5,714,569, incorporated herein by reference.

Formulation of the Polyester Blend

The polyester blend composition is prepared by blending the polyhydroxyalkanoate and the aliphatic ester polycondensate. The blend may be either prepared by melt-blending at a temperature sufficient to melt both polymers, or by solution blending in a common solvent. Preferably the solvent is a chlorinated solvent, more preferably chloroform. The solvent may be removed after the polymers are blended. The polyhydroxyalkanoate and the aliphatic ester polycondensate are intimately blended into a composite structure.

Preferably the polyester blend composition is substantially free of, preferably free of, surfactants, compatibilizers, initiators and inorganic fillers. As used herein, "initiators" refer to transesterification catalysts, including inorganic oxy compounds such as alkoxides, phenoxides, enolates or carboxylates of calcium, aluminum, titanium, zirconium, tin, antimony or zinc. As used herein, "inorganic fillers" refer to fillers such as oxides, hydroxides, carbonates, and sulfates of metals, such as metals selected from the Group IIA, IIIB and IVA of the Periodic Table. As used herein, "substantially free of surfactants, initiators and inorganic fillers" refers to surfactants, initiators and/or inorganic fillers each individually being present at a level of less than about 1%, more preferably less than about 0.5%, by weight of the polyester blend composition.

As used herein, "plasticizers" refer to compounds and oligomers having a molecular weight of no more than about 2000 gram/mole which are added to polymers to improve flexibility and which, when mixed with a polymer, typically lower the polymer's glass transition temperature. Plasticizers include glycerol diacetate, toluene diacetate, toluene sulfonamide, di-2-ethylhexyl adipate, butyl acetyl ricinoleate, triethylene glycol diacetate, triethylene glycol caprylate, chlorinated paraffin, di-isobutylphthalate, di-isoheptylphthalate, di-iso-octylphthalate, di-isononylphthalate, di-isodecylphthalate, butyl benzyl phthalate, didecyl phthalate, poly(oxyethylene)(4) lauryl ether, epoxidized soy bean oil, dibutyl maleate, methyl laureate and mixtures thereof. Preferably the polyester blend composition contains only a limited amount of plasticizers. As used herein, "a limited amount of plasticizers" refers to a level of less than about 10%, more preferably less than about 5%, by weight of the polyester blend composition. The plasticizer may further contribute to an improvement in the toughness and ductility of the material, although it is not require in the composition in order to obtain the advantageous combination of properties described above.

The compositions may further include various non-polymeric components including among others nucleating agents, anti-block agents, antistatic agents, slip agents, antioxidants, pigments or other inert fillers and the like. These additions may be employed in conventional amounts, although typically such additives are not required in the composition in order to obtain the toughness, ductility and other attributes of these materials. One or more plasticizers may be employed in the compositions in conventional amounts, although again, the plasticizers are typically not required in order to obtain the advantageous combination of properties described above.

The polyhydroxyalkanoate is present at a level of at least about 20%, preferably from about 30% to about 70%, and more preferably from about 40% to about 60%, by weight of the total of the polyhydroxyalkanoate and aliphatic ester polycondensate. The aliphatic ester polycondensate is present of a level of at least about 20%, preferably from about 30% to about 70%, and more preferably from about 40% to about 60%, by weight of the total of polyhydroxyalkanoate and aliphatic ester polycondensate. The ratio of polyhydroxyalkanoate to aliphatic ester polycondensate is from about 20:80 to about 80:20, by weight, or from about 0.25:1 to about 4:1, by weight. More preferably the polyester blend comprises polyhydroxyalkanoate and aliphatic ester polycondensate in a weight ratio of from about 40:60 to about 60:40. At these nearly balanced ratios, the combination of both materials contribute to an optimization of the desirable properties.

Although additional polymers may be blended with the polyhydroxyalkanoate and the aliphatic ester polycondensate, the additional polymers are not required in order to obtain a ductile product. Generally the polyester blend is substantially free of any additional polymers, i.e., comprises less than 10%, by weight of the total blend, of additional polymers. Preferably the polyester blend consists essentially of polyhydroxyalkanoates and aliphatic ester polycondensates.

Articles of Manufacture

The polyester blends of the present invention can be processed into a variety of super tough and ductile plastic articles, including films, sheets, fibers, webs, nonwovens and molded articles. They may also be used as tough coatings or binders involved in the fabrication of coated articles or Articles prepared from the polyester blends generally exhibit upon deformation a greater degree of shear yielding rather than crazing, and articles prepared from the polyester blend comprising polyhydroxyalkanoates and aliphatic ester polycondensates exhibit less crazing and less brittleness than comparable articles prepared solely from polyhydroxyalkanoates. Articles prepared from the polyester blends exhibit toughness and ductility equal to or greater than similar articles prepared from polyolefins.

As used herein, "film" means an extremely thin continuous piece of a substance having a high length to thickness ratio and a high width to thickness ratio. While there is no requirement for a precise upper limit of thickness, a preferred upper limit is about 0.254 mm, more preferably about 0.01 mm, and even more preferably about 0.005 mm. The films of the present invention may be used as liquid impervious backsheets having increased biodegradability and/or compostability. They may also be used to make compostable trash bags or agricultural films. The films may be processed using conventional procedures for producing single or multilayer films on conventional film-making equipment.

As used herein, "sheet" means a very thin continuous piece of a substance, having a high length to thickness ratio and a high width to thickness ratio, wherein the material is thicker than about 0.254 mm. Sheeting shares many of the same characteristics as film in terms of properties and manufacture, with the exception that sheeting is stiffer, and has a self-supporting nature.

As used herein, "fiber" refers to a flexible, macroscopically homogeneous body having a high length-to-width ratio and a small cross section. They may be used for the fabrication of yard waste nets of fishing nets. As used herein, "foam" refers to polyester blends of the present invention whose apparent density has been substantially decreased by the presence of numerous cells distributed throughout its bulk. The foam may be used for the fabrication of disposable cups for instance. In another embodiment of the present invention, the plastic article is a molded article. As used herein, "molded article" means objects that are formed from polymer blends which are injected, compressed, or blown by means of a gas into a shape defined by a mold. They may be used for the fabrication of compostable packaging or cutlery.

The present invention further relates to disposable personal care products comprising polyester blend compositions of the present invention. For example, compostable absorbent articles comprising a liquid pervious topsheet, a liquid impervious backsheet comprising a film formed of the polyester blend, and an absorbent core positioned between the topsheet and backsheet. Such absorbent articles include infant diapers, adult incontinent briefs and pads, and feminine hygiene pads and liners. The absorbent article may comprise tape tab fasteners such as are commonly used on diapers, or an adhesive backing, such as is commonly used in feminine hygiene pads.

Films of the present invention used as liquid impervious backsheets in absorbent articles of the present invention, such as disposable diapers, typically have a thickness of from about 0.01 mm to about 0.2 mm, preferably from about 0.012 mm to about 0.051 mm. In preferred embodiments, films of the present invention, in addition to increased biodegradability and/or compostability, have one or more of the following properties:

a) a machine direction (MD) tensile modulus from about 10,000 to about 100,000 lbs/sq. in. (from about $6.895 \times 10^8$ dynes/sq. cm to about $6.895 \times 10^9$ dynes/sq.cm), b) a MD tear strength of at least about 70 grams per 25.4 μm of thickness, c) a cross machine direction (CD) tear strength of at least about 70 grams per 25.4 μm of thickness, d) an impact strength of at least about 12 cm as measured by falling ball drop, e) a moisture transport rate less than about 0.0012 grams per square centimeter per 16 hours, f) a modulus at 60 C. of at least about $5.52 \times 10^7$ dynes/sq.cm (about 800 lbs/sq. in), and g) a thickness from about 12 μm to about 75 μm.

The backsheet may be formed from a polyester blend according to the present invention comprising a PHA and an AEP in relative weight fraction ranging from 4:1 to 1:4. In one embodiment the AEP is prepared from 1,4-butanediol and succinic acid or its anhydride, while in another embodiment the AEP is prepared from 1,4-butanediol, succinic acid or its anhydride and adipic acid or its anhydride. In one embodiment the PHA comprises at least two RRMUs wherein the first RRMU has the structure:

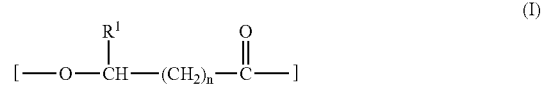

(I)

wherein $R^1$ is H, or C1 or C2 alkyl, and n is 1 or 2.

The second RRMU included in the biodegradable polyhydroxyalkanoate copolymer comprises at least one monomer selected from the group consisting of the structures (II) and (III):

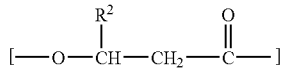
(II)

wherein R is a C3-C19 alkyl or C3-C19 alkenyl, and

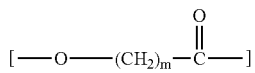
(III)

wherein m is from 2 to about 16.

Generally at least 50%, preferably from about 50% to about 99.9%, more preferably from about 80% to about 99.5%, even more preferably from about 90% to about 99%, of the RRMUs in the PHA have the structure of the first RRMU.

The topsheet is preferably soft-feeling and non-irritating to the wearer's skin. Further, the topsheet is liquid pervious, permitting liquids to readily penetrate through its thickness. A suitable topsheet may be manufactured from a wide range of materials such as porous foams, reticulated foams, apertured plastic films, natural fibers (e.g., wood or cotton fibers), synthetic fibers (e.g., polyester or polypropylene fibers) or from a combination of natural and synthetic fibers. Preferably, the topsheet is made of a hydrophobic material to isolate the wearer's skin from liquids in the absorbent core.

In one embodiment, the top sheet is a nonwoven material made of a polyester blend prepared according to the present invention. In one embodiment the AEP is prepared from 1,4-butanediol and succinic acid or its anhydride, while in another embodiment the AEP is prepared from 1,4-butanediol, succinic acid or its anhydride and adipic acid or its anhydride. The PHA comprises at least two different RRMUs, wherein the first RRMU has the structure:

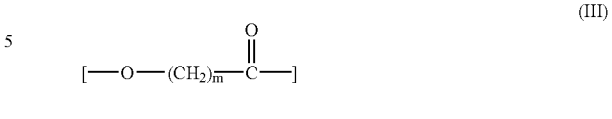
(I)

wherein $R^1$ is H, or C1 or C2 alkyl, and n is 1 or 2.

The second RRMU included in the biodegradable polyhydroxyalkanoate copolymer comprises at least one monomer selected from the group consisting of the structures (II) and (III):

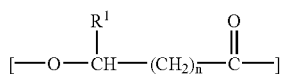
(II)

wherein $R^2$ is a C3-C19 alkyl or C3-C19 alkenyl, and

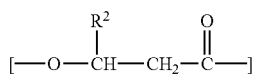
(III)

wherein m is from 2 to about 16.

Generally at least 50%, preferably from about 85% to about 99.5%, more preferably from about 90% to about 99.5%, even more preferably from about 95% to about 99.5%, of the RRMUs have the structure of the first RRMU.

The topsheet and the backsheet are joined together in any suitable manner. As used herein, the term "joined" encompasses configurations whereby the topsheet is directly joined to the backsheet by affixing the topsheet directly to the backsheet, and configurations whereby the topsheet is indirectly joined to the backsheet by affixing the topsheet to intermediate members which in turn are affixed to the backsheet. The backsheet and topsheet may be joined using an adhesive comprising a PHA.

In one embodiment, the adhesive joining the topsheet to the backsheet comprises a polyester blend according to the present invention comprising a PHA and an AEP. The PHA comprising at least two RRMUs, wherein the first RRMU has the structure:

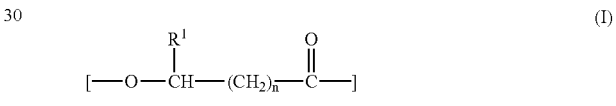
(I)

wherein $R^1$ is H, or C1 or C2 alkyl, and n is 1 or 2.

The second RRMU included in the biodegradable polyhydroxyalkanoate copolymer comprises at least one monomer selected from the group consisting of the structures (II) and (III):

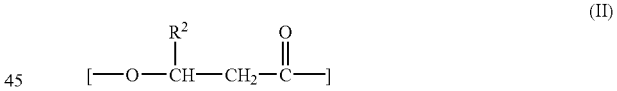
(II)

wherein $R^2$ is a C3-C19 alkyl or C3-C19 alkenyl, and

(III)

wherein m is from 2 to about 16.

Preferably at least 50% of the RRMUs have the structure of the first RRMU.

The absorbent core of the absorbent article is positioned between the topsheet and backsheet. The absorbent core may be manufactured in a wide variety of sizes and shapes and from a wide variety of materials. The total absorbent capacity of the absorbent core should, however, be compatible with the designed liquid loading for the intended use of the absorbent article.

The absorbent core may comprise wood pulp fibers, PHAs, absorbent gelling materials and mixtures thereof. In one embodiment the absorbent core comprises a polyester blend of the present invention, in which the PHA comprises at least two RRMUs wherein the first RRMU has the structure:

wherein $R^1$ is H, or C1 or C2 alkyl, and n is 1 or 2.

The second RRMU included in the biodegradable polyhydroxyalkanoate copolymer comprises at least one monomer selected from the group consisting of the structures (II) and (III):

wherein $R^2$ is a C3-C19 alkyl or C3-C19 alkenyl, and

wherein m is from 2 to about 16.

Generally at least 50%, preferably from about 80% to about 99.5%, more preferably from about 90% to about 99.5%, even more preferably still from about 95% to about 99.5%, of the RRMUs have the structure of the first RRMU.

In one embodiment the absorbent article comprises one or more elastic members disposed adjacent to the periphery of the article. The elastic member may comprise a PHA. In one embodiment, the elastic member comprises a PHA comprising two RRMUs wherein the first RRMU has the structure:

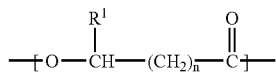

wherein $R^1$ is H, or C1 or C2 alkyl, and n is 1 or 2; and the second RRMU has the structure:

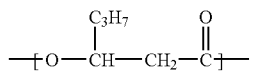

Generally at least 50%, preferably from about 50% to about 99.9%, more preferably from about 80% to about 99.5%, even more preferably from about 90% to about 99% of the RRMUs have the structure of the first RRMU.

Films of the present invention may be used for the fabrication of compostable plastic bags using conventional manufacturing film-making processes (e.g., blown film, cast film, etc.). The bag may be further subjected to post-forming transformation processes, such as the ones described in the examples below, for the purpose of improving the performance of the bag or for source material reduction (downgauging). The bags may be disposed together with their compostable content in composting facilities, without the need for separation or the risk of compost contamination.

Compositions of the present invention may be used as biodegradable coatings for a variety of substrates, most preferably paper substrates. They may be applied from the melt or from solution, and act as a moisture barrier to otherwise moisture sensitive materials. Examples of such products are coated paper cups or paper plates with improved durability in use. Yet, such articles can be disposed in the same manner as paper substrates.

EXAMPLES

The following examples illustrate the practice of the present invention but are not intended to be limiting thereof. Additional embodiments and modifications within the scope of the claimed invention will be apparent to one of ordinary skill in the art. Accordingly, the scope of the present invention shall be considered in the terms of the following claims, and is understood not to be limited to the methods described in the specification.

Example 1

This Example demonstrates the preparation of blends comprising a branched copolymer of poly(hydroxyalkanoate) mixed with one or several ester polycondensates to form one of the blend compositions of the present invention. Such blends are successfully prepared according to several alternative routes. They are either obtained by solution-blending two or more of the above polymers in a common solvent (such as chloroform), followed by precipitation of the blend in a non-solvent. On a practical standpoint, solution-blending is only attractive if a solvent is needed for extracting the polyhydroxyalkanoate copolymer from its biological growth medium. Such blends have also been prepared in a Banbury-type mixer which is ideal for preparing small batches of material, ideal for properties characterization and performance assessment. Larger blend quantities are typically prepared in house using a Haake Twin Screw Extruder. Control of mixing conditions is possible by selecting the temperature profile throughout the 4 different heating zones and the torque applied to the screws. Pellets are obtained by extruding and cutting a strand of the blend through a round die after the strand is allowed to cool down and crystallize in a temperature-controlled water bath. Alternatively, film material may be extruded through a cast film die which is collected over a set of heated rolls where the polymer blend can solidify.

Examples of blends that have been successfully prepared via the above methods include:

80/20 or 60/40 blends of a bacterial PHBHx copolymer (poly(3-hydroxybutyrate-co-11.3% 3-hydroxyhexanoate), i.e. comprising 11.3% of a second RRMU as defined in the present invention, Mw>500 k) with Bionolle 3001 (a high MW polybutylene succinate-co-adipate containing a fraction of urethane linkages, from Showa Highpolymer Co.,LDT, Tokyo, JP) . These are easily melt-extruded into cast films at various extrusion temperatures (155° C., 165° C.) before being collected onto a heated roll;

80/20 or 60/40 blends of a bacterial PHBHx copolymer with a lower molecular weight (higher melt flow rate) Bionolle 3020 (MFR=20), again from Showa Highpolymer.

80/20 or 60/40 blends of bacterial PHBHx of various compositions (i.e. various molar ratio of 3-hydroxybutyrate and 3-hydroxyhexanoate) with EastarBio (a ester polycondensate containing both aliphatic and therephtalic acids condensed with aliphatic diols) which again can be extruded into thin films by a conventional thin film casting process.

a 60/20/20 blend of PHBHx/Bionolle 1020/EastarBio.

Blends like the one above, in which 20% of plasticizers such as n-butyl maleate is added.

Example 2

This Example illustrates the significant improvement in toughness observed in blends of PHA copolymers with ester polycondensates. Stiffness-toughness data are measured on compression-molded films, using a single notch-size characterization method. The method consists of loading a wide specimen containing a notch in its center, the notch representing the locus of fracture initiation and propagation of the crack through the specimen ligament as the latter is subject to tensile loading. The initial slope of the curve provides a measure of the stiffness or rigidity of the ligament, which also scales inversely to its flexibility. It is defined by the elastic modulus, which essentially tells how much a polymer initially deforms upon loading, over the linear range of the load-displacement curve (Hooke' law). It also often provides a reasonable idea of the amount of load that the material can possibly sustain before undergoing either large (plastic) deformation or failure. The type of application intended for a material dictates the desirable level of stiffness or flexibility. For instance, a film with good drape of feel will require a polymer with low stiffness, i.e. high flexibility, whereas rigid packaging bottles will need to rely on a stiffer polymer. The broad range of applications that is anticipated for the blend compositions of the present invention dictate that our blends cover a range of stiffness that may largely be controlled by the selection of the blend components (their amount of crystallinity, which varies inversely to the comonomer content) as well as the composition of the blends.

Toughness is an important selection criteria for materials. In many applications, it is important that a material exhibits a capacity to resist catastrophic (brittle) or progressive (ductile) failure during fabrication and use. A material is considered brittle if the crack propagation is unstable; Conversely, stable crack growth is indicative of a ductile material. Methods have been developed to quantify a material's ability to absorb or dissipate the mechanical energy imparted to the system when subjected to a tensile load. A notched biaxial tear test is a method often used by the scientific community to evaluate toughness in thin films. A single-point-characterization of the toughness is obtained by measuring the fracture energy (i.e. the energy under the tensile loading curve) up to the point where the load drops back to ⅔ of the maximum load that the specimen is capable of supporting before the onset of crack propagation. The definition of such a criteria allows to not only account for the mechanical energy required for fracture to initiate, but also encompasses the energy required for the fracture to propagate throughout the specimen.

The following table summarizes our experimental findings upon testing a variety of compression-molded films.

| Polymer Type | Tensile Modulus (MPa) | Fracture Toughness (kJ/m$^2$) |
|---|---|---|
| Poly (3HB-co-3Hx (6.8%)), Mw = 685 k | 495 | 15 |
| Poly (3HB-co-3Hx (10.8%)) Mw = 665 k | 335 | 52 |
| Bionolle 1001 (Showa Highpolymer Co.) | 310 | 310 |
| Bionolle 3001 (same) | 217 | 518 |
| 50/50 Blend PHBHX (6.8%)/Bionolle 3001 | 280 | 264 |
| 30/70 Blend PHBHX (10.8%)/Bionolle 3001 | 208 | 465 |
| 50/50 Blend PHBHX (10.8%)/Bionolle 3001 | 248 | 401 |
| 70/30 Blend PHBHX (10.8%)/Bionolle 3001 | 275 | 179 |
| HDPE (PolySciences Inc.) Mw = 125 k | 337 | 119 |
| LDPE (Quantum, now Equistar) | 98 | 164 |
| iPP (Aldrich), Mw ~ 250 k | 514 | 141 |
| LLDPE (Dow 2045) | 138 | 203 |

The data are clearly indicative of the significant improvement in toughness observed for the blends containing Bionolle, over that of PHA's alone. Also, benchmarking against major semicrystalline polyolefins confirm the equal or greater toughness of our blend compositions over polyolefins, hence opening the possibility of film downgauging and material reduction, without a loss in performance, compared with polyolefins.

Example 3

This Example is the second one to demonstrate the very significant improvement in toughness observed in blends of PHA copolymers with ester polycondensates. Fracture toughness data were obtained on a large number of extruded/cast film specimens containing various notch sizes, using the multi-specimen approach known in the field of fracture testing as the "Essential Work Method". This test is more elaborate that the previous one and requires testing specimens with various initial notch lengths. The method is known to and used by experts in the field of film fracture and is useful because it provides a two-parameter characterization of a film material's resistance to fracture. Again, the table below can be used to compare the relative performance of various film materials. In this case, a commercial high-performance garbage bag (Glad Quick-Tie, 0.74 mil thickness) made of polyethylene is tested in both Machine (MD) and Cross (CD) directions and compared with an melt-extruded cast film sample made of a 60/40 blend of poly (3HB-co-3Hx(11.3%)) and Bionolle 3001. The results of the multi-specimen test are given in the table below, normalized by the thickness. Not only is the average of the MD and CD tear data superior by almost 20% for the film made with the aliphatic polyester blend, but the anisotropy in performance in the two directions is much less; As a result, the weaker direction of our blend is not as weak as that of PE and thus is less prone to unexpected failure.

| Polymer Type | We (kJ/m$^2$) | | | bWp (MJ/m$^3$) | | |
|---|---|---|---|---|---|---|
| | MD | Avg. | CD | MD | Avg. | CD |
| 60/40 Poly (3HBHx (11.3%))/Bionolle 3001 | 56 | 43 | 31 | 12 | 12 | 12 |
| Glad Quick Tie, 0.74 mil | 60 | 37 | 15 | 14 | 10.5 | 7 |

Example 4

This Example reports the transformation of a film of a blend composition described in Example 1 in a high-speed solid state stretching operation. Such a transformation is enabled by the improved fracture toughness of the blend compositions of the present invention. Several such high-speed stretching processes applied to polymer substrates in the solid state are described in both the technical and patent literature. Homogeneous stretching processes, as exemplified by tenterframing (see J. H. Briston in Plastic Films, $2^{nd}$ ed. Longman Inc. New York (1983) pages 83-85) are typically used to stretch films, sheets or fibers/nonwovens uniaxially or biaxially, and, if biaxially, the stretching steps may be performed sequentially, simultaneously, or any combination thereof. Inhomogeneous stretching processes, such as Ring-Rolling (U.S. Pat. Nos. 4,116,892 and 5,296,184) or SELFing (U.S. Pat. Nos. 5,518,801 and 5,691,035) have also been previously disclosed and consist of incremental and localized stretching of film sections that is obtained by forcing the web through a pair of grooved rolls that can exhibit a variety of patterns. Other processes known in the field for the transformation of polymer substrates may equally be used, whether they involve the formation of pinholes (hydroforming), the formation of many small dimples or the deformation/stretching at a larger scale as imparted by larger appendices.

We have found that PHA copolymer substrates are often too fragile to be easily handled in such transformation processes without undegoing shredding, especially at the conditions of high strain-rates ($>1$ s$^{-1}$) and low temperature (i.e. room temperature) that are most typically encountered in such operations. Physical aging of PHA films over time further adversely affect their toughness. The latter necessitates a thermal annealing treatment for the material to be "rejuvenated". At high temperature and high deformation rate, plastic deformation takes place without early failure, but the material is seen to largely recover upon rapid unloading, and the material tend to return to its initial state prior to stretching. A combination of high temperature and low deformation rate has been found to be necessary in order to prevent both shredding and extensive recovery. This however imposes severe limitations on the process execution and can greatly affect its economics.

We have found that the enhanced fracture toughness of the blend compositions described in Example 1 allow us to successfully broaden the range of conditions for which solid state stretching could be successfully performed, including under most unfavorable but economically preferred conditions of high strain-rate and low temperature, without the film shredding or undergoing extensive recovery, and without the need for any "rejuvenating" thermal pretreatment. Based upon this success, several solid-state stretched film specimens were tested for their mechanical properties. Results are reported in Example 5.

Example 5

This Example demonstrates the high toughness of films transformed by the above high-strain-rate solid-state processing operations. The next table compares the toughness of the same films as in Example 3, before and after the films are subjected to a process of incremental stretching in the solid state, between two metallic rolls. The selection of patterns on the grooves used in this particular test is that of SELFing, which has been previously described as being capable of imprinting narrow bands of unstretched material in the direction diagonal to stretching, superimposed with stretched and unstretched bands that regularly alternate in the direction perpendicular to the web. Toughness is once again measured by the "Essential Work Method" described above, which provides two important parameters that describe the relative performance of films with respect to fracture initiation and propagation.

| Polymer Type | We (kJ/m$^2$) | | | bWp (MJ/m$^3$) | | |
| --- | --- | --- | --- | --- | --- | --- |
| | MD | Avg. | CD | MD | Avg. | CD |
| 60/40 Poly (3HBHx (11.3%))/Bionolle 3001 | 56 | 43 | 31 | 12 | 12 | 12 |
| Biodegradable blend, after SELFing | 67 | 57.5 | 48 | 17 | 15.5 | 14 |
| Glad Quick Tie, 0.74 mil | 60 | 37 | 15 | 14 | 10.5 | 7 |
| PE kitchen bag, after SELFing | 71 | 43 | 14.5 | 11.5 | 10 | 8.5 |

As clearly illustrated in this example, the high toughness of the film made with a blend composition of the present invention can be even further improved by transforming the film via SELFing, resulting in ultra-tough film material of increased value in high-performance application (high puncture-resistant bags). The change in toughness observed for the commercial PE bag as a result of SELFing is comparatively small.

Example 6

This Example demonstrates the partial recoverability observed in stretched films made with blends of the present invention. The films are stretched via the same SELFing process as described above, at ~75° C. under high strain-rate conditions. The ability of the SELFed films to recover in the direction of SELFing, upon subsequent drawing by incremental amounts, is indicated in the table below. This is simply measured using an Instron Tensile Tester after a specimen is drawn up to various elongations, progressively unloading the specimen until no tension is left in the sample, then measuring the residual extension left in the specimen. Film samples tested include: A commercial Glad bag made of polyethylene, a commercial compostable bag from Biocorp Inc., an extruded cast film made of a 60/40 blend of PHBHx(11.5%)/EastarBio (the latter being provided by Eastman Chemicals, USA), and an extruded cast film made of a 60/40 blend of PHBHx(11.3%)/Bionolle 3001 (the latter from Showa Denko, Japan).

| Strain applied | PE Glad bag % recovery | | Compost bag % recovery | | PHA/EastarBio % recovery | | PHA/Bion.3001 % recovery | |
|---|---|---|---|---|---|---|---|---|
| | Initial | SELFed | Initial | SELFed | Initial | SELFed | Initial | SELFed |
| 40% | 45 | 29 | 42 | 35 | 49 | 71 | 33 | 46 |
| 80% | 45 | 38 | 30 | 27 | 41 | 51 | 27 | 36 |
| 150% | 40 | 39 | 24 | 24 | 34 | 41 | 24 | 30 |

As evidenced by the data, the polyester blends that contain PHA copolymers, exhibit a greater recoverability upon stretching up to 150% that the PE Glad bag or the commercial bag. The greater elasticity of the blends of the present invention after SELFing, represents another valuable benefit in the ability of the material to adopt various shapes and for a product made with the material to more easily conform to a variety of substrates.

Example 7

This Example demonstrates the crystallization kinetics benefit observed by blending PHA copolymers with Ester polycondensates such as Bionolle 3001. As said earlier, PHA's are generally fairly slow to crystallize, as a result of their intrinsic slow crystal nucleation and crystal growth. Technical leads for speeding up crystallization are required for these polymers to become processible at speeds comparable to other common polymers. Blends of the present invention provides a means of speeding up the crystallization rate of PHA's. This is evidenced by the data outlined in the following table; The data represent the time required for approximately half of the crystallization to take place, at a given temperature, after the melt is quickly cooled down to that temperature (50° C. in this particular example). For a blend composition, there may be two discrete minima that represents the half-time crystallization for each of the blend components. The data are provided by a Differential Scanning Calorimeter (DSC) operated under isothermal conditions which is capable of measuring the overall crystallization exotherm associated with the crystallization.

| Polymer Type | Half-time t1 (min) | Half-time t2 (min) |
|---|---|---|
| Poly (3HB-co-3Hx (10.8%)) Mw = 665 k | | 5.5 |
| Bionolle 3001 (Showa Highpolymer) | <0.25 | |
| 30/70 Blend PHBHx (10.8%)/Bionolle 3001 | 0.36 | 1.1 |
| 50/50 Blend PHBHx (10.8%)/Bionolle 3001 | 0.37 | 4.0 |
| 70/30 Blend PHBHx (10.8%)/Bionolle 3001 | | 3.9 |

Based upon the data, the crystallization half-time may be reduced between 30% and 80% of that of pure PHA, depending upon the relative content of Bionolle 3001 in the blend.

Example 8

This Example illustrates the broadening of the temperature range over which the blends of the composition are considered useful. Indeed, it is commonly recognized in the polymer field that the range of use of semicrystalline polymers as far as applications are concerned is delineated by the glass transition temperature (Tg) at the lower end and by the melting temperature at the upper one. In several instances of our blend compositions, one finds that the two components remain immiscible and therefore exhibit separate glass transitions and melting points. Tg of the Ester polycondensate is often lower than that of the PHA copolymer (even in the presence of the plasticizer), but the melting temperature of the latter is often higher by several tens of degrees (see table below for thermal transition values as determined by DSC). Therefore, the blend composition enjoys a wider temperature span between the lower Tg of the ester polycondensate and the higher melting of the PHA, hence widening the range of use of the blend composition in a variety of applications.

| Polymer Type | Tg's (° C.) | Tm's (° C.) |
|---|---|---|
| Poly (3HB-co-3Hx (10.8%)) Mw = 665 k | −3 | 118 |
| Bionolle 3001 (Showa Highpolymer) | −42 | 90 |
| Eastar Bio (Eastman Chemical) | −37 | 104 |
| 30/70 Blend PHBHx (10.8%)/Bionolle 3001 | −41 & −4 | 90 & 117 |
| 50/50 Blend PHBHx (10.8%)/Bionolle 3001 | −40 & −3 | 90 & 116 |
| 70/30 Blend PHBHx (10.8%)/Bionolle 3001 | −38 & −3 | 90 & 116 |
| 60/40 Blend PHBHx (11.5%)/Eastar Bio | −33 & 0 | 112 |

Example 9

This Example illustrates the changes that occur in the rheological behavior of the polymers upon blending; Because of their relatively high intrinsic rigidity as evidenced by their high molecular weight between entanglements (see J-P Autran et al., 8th Annual meeting of the *Bio/Environmentally Degradable Polymer Society*, Aug. 21, 1999, New Orleans), the complex viscosity of PHA's is generally lower than that of ester polycondensates, and requires sufficiently high molecular weight to build-up sufficient viscosity and melt-elasticity for the material to process well in the melt. Ester polycondensates can contribute to increasing the melt viscosity in blends with PHA's, especially at high temperatures or low shear rates, as evidence in the Theological data displayed below for a synthetic Poly(3HB-co-3Hx(11%)) grade and Bionolle 3001, based upon dynamic mechanical measurements performed in the melt at 150° C. Also, over the range of frequency tested, shear thinning is also enhanced in PHA's via the addition of Bionolle 3001, a favorable feature in many processing applications.

|  | Complex Viscosity (Pa.s) | | Storage Modulus (Pa) | |
|---|---|---|---|---|
|  | frequency | | | |
|  | (rad/s) | | (rad/s) | |
| Polymer Type | 10^−1 | 10^2 | 10^−1 | 10^2 |
| Poly (3HB-co-3Hx (11%)) | 1.15 10^4 | 1.5 10^3 | 8.5 10^1 | 1.1 10^5 |
| Bionolle 3001 (Showa Highpolymer) | 2.26 10^4 | 2.00 10^3 | 6.3 10^2 | 1.3 10^5 |
| 50/50 Blend PHBHx (11%)/Bionolle 3001 | 1.25 10^4 | 1.25 10^3 | 1.8 10^2 | 1.05 10^5 |

Example 10

This Example demonstrates an improvement in the odor barrier properties of the blend compositions over traditional polyolefins or Ester polycondensates. Extruded-cast film samples are thermally sealed into small containers, in which are placed food products that exhibit strong, easily noticeable smell (such as onions, mint . . . ). The little envelope-shaped containers are then completely sealed and placed in jars that are kept closed. By monitoring the intensity of the smell that develops over time in the jar, it is possible to qualitatively assess the ability of the polymer to contain the small molecules that are responsible for the strong odor that is entrapped inside the envelope. In all our tests, PHA-based films such as our 60/40 Poly(3HBHx(11.3%))/ Bionolle 3001 blend composition, have been found to systematically provide better containment of aromas over a longer period of time, when compared to polyolefins (Linear low density polyethylene) or ester polycondensates (Bionolle 3001, Eastar Bio).

Example 11

This Example demonstrates the biodegradability of the blend compositions. Just like the blend components are known to biodegrade over time in a compost environment, the blend compositions of the present invention also do so. As expected, biotic, areobic and wet environments are generally found to provide the most propitious conditions for breaking down the materials and favor biodegradation and eventually mineralization of the blend components. Although objects of differing shapes and forms are expected to yield different rates of biodegradation, a 60/40 Poly (3HBHx(11.3%))/Bionolle 3001 blend or a 60/40 blend of PHBHx(11.5%)/ EastarBio have been found to virtually undergo complete biodegradation (>90%) in a standard compost test.

Example 12

This Example demonstrates the use of such blend compositions in the making of lawn/leaf bags. The procedure described here applies, but is not limited, to extrusion-cast films. Other film types, such as blown films may be used. Extruded-cast films of a blend composition are prepared on standard film extrusion equipment, having a thickness typically comprised between 0.01 mm to 0.1 mm and a width between 30 cm to 100 cm. The film materials are easily turned into bags of different sizes by a thermal sealing process, which is used to form the bottom as well as the sides of the bags. Finally, individual bags are separated after cutting the sealed films along the sealed joints. The bags can then by subjected to a solid state deformation process such as those described above. In one instance, the bag is heated up to 70° C. prior to being forced between textured metallic rolls, which are responsible for imparting localized stretched regions separated by unstretched regions. The spatial arrangement of these in the films is dictated by the patterning of the rolls. The result of the patterning is to further enhance the fracture toughness of the bag while increasing its capacity and its stretchability, hence resulting in a overall material reduction for the product.

What is claimed is:

1. A polyester blend composition comprising:
   (a) from about 70% to about 30% by weight of a polyhydroxyalkanoate copolymer comprising at least two randomly repeating monomer units wherein the first randomly repeating monomer unit has the structure (I):

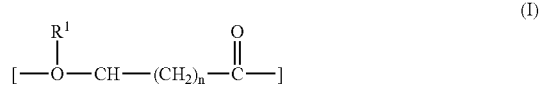

wherein $R^1$ is H, or a C1-C2 alkyl, and n is 1 or 2; the second randomly repeating monomer unit comprises at least one monomer selected from the group consisting of the structures (II) and (III):

wherein $R^2$ is a C3-C19 alkyl or C3-C19 alkenyl, and

wherein m is from about 2 to about 16; and
   (b) from 30% to about 70% by weight of an aliphatic ester polycondensate synthesized from an aliphatic polyhydric alcohol and an aliphatic polycarboxylic acid compound, wherein the weight average molecular weight of the ester polycondensate is from about 50,000 to about 500,000.

2. A polyester blend composition according to claim 1, wherein the polyhydric alcohol is a dihydric alcohol, and further wherein the polycarboxylic acid compound is a dicarboxylic acid compound selected from the group consisting of dicarboxylic acids, dicarboxylic acid anhydrides and mixtures thereof.

3. A polyester blend composition according to claim 2, wherein the aliphatic ester polycondensate is synthesized from a dicarboxylic acid compound selected from the group consisting of compounds having the formula:

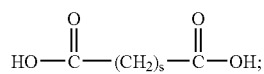

-continued

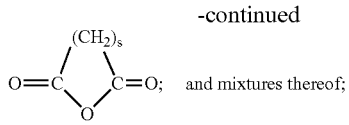
and mixtures thereof;

wherein s is from about 1 to about 10; and a dihydric alcohol having the formula: HO—(CH$_2$)$_t$—OH wherein it is from about 2 to 10.

4. A polyester blend composition according to claim 2, wherein the aliphatic ester polycondensate contains less than 50% by weight of aromatic diacids.

5. A polyester blend composition according to claim 1, wherein the polyhydroxyalkanoate copolymer (a) further comprises a third randomly repeating monomer unit having the structure (IV):

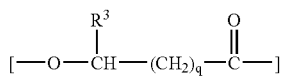
(IV)

wherein R$^3$ is H or a C$_{1-19}$ alkyl or alkenyl; and q is 1 or 2; and wherein the third randomly repeating monomer unit is not the same as the first randomly repeating monomer unit or the second randomly repeating monomer unit.

6. A polyester blend composition according to claim 5, wherein the third randomly repeating monomer unit is selected from the group consisting of the monomer wherein R$^3$ is C$_1$ alkyl and q is 1, the monomer wherein R$^3$ is C$_2$ alkyl and q is 1, the monomer wherein R$^3$ is H and q is 2, the monomer wherein R$^3$ is H and q is 1, and mixtures thereof.

7. A polyester blend composition according to claim 1, wherein the first randomly repeating monomer unit is selected from the group consisting of the monomer wherein R$^1$ is C$_1$ alkyl and n is 1, the monomer wherein R$^1$ is C$_2$ alkyl and n is 1, the monomer wherein R$^1$ is H and n is 2, the monomer wherein R$^1$ is H and n is 1, and mixtures thereof.

8. A polyester blend composition according to claim 1, wherein at least 50% of the randomly repeating monomer units in copolymer (a) have the structure of the first monomer unit.

9. A polyester blend composition according to claim 1, wherein the polyester blend is substantially free of compatibilizers.

10. A polyester blend composition according to claim 1, wherein the polyester blend is substantially free of initiators.

11. A polyester blend composition according to claim 1, wherein the polyester blend further comprises up to 20%, by weight, of a plasticizing agent.

12. A polyester blend composition according to claim 1, wherein the polyester blend composition consists essentially of the polyhydroxyalkanoate copolymer and the aliphatic ester polycondensate.

13. A method of making a polyester blend composition, comprising the step of blending (a) a polyhydroxyalkanoate copolymer comprising at least two randomly repeating monomer units wherein the first randomly repeating monomer unit has the structure:

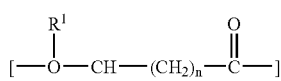
(I)

wherein R$^1$ is H, or a C1-C2 alkyl, and n is 1 or 2; the second randomly repeating monomer unit comprises at least one monomer selected from the group consisting of the structures (II) and (III):

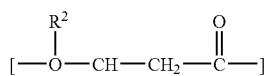
(II)

wherein R$^2$ is a C3-C19 alkyl or C3-C19 alkenyl, and

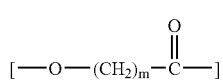
(III)

wherein m is from about 2 to about 16; and (b) an aliphatic ester polycondensate synthesized from an aliphatic polyhydric alcohol and an aliphatic polycarboxylic acid compound;

wherein the polyester blend composition is about 70% to about 30% by weight of the polyhydroxyalkanoate copolymer and from 30% to about 70% by weight of the aliphatic ester polycondensate and the weight average molecular weight of the ester polycondensate is from about 50,000 to about 500,000.

14. A method according to according to claim 13, wherein the polyhydroxyalkanoate copolymer and aliphatic ester polycondensate are compatible and immiscible.

15. A method according to claim 14, wherein the weight ratio of polyhydroxyalkanoate copolymer to aliphatic ester polycondensate is from between 70:30 to about 30:70 and wherein at least 50% of the randomly repeating monomer units in copolymer (a) have the structure of the first monomer unit.

16. A method according to claim 13, wherein the step of blending comprises melt-blending.

17. A method according to claim 13, wherein the step of blending comprises solution-blending a polyhydroxyalkanoate copolymer and an aliphatic ester polycondensate in a common solvent.

18. A method according to claim 13, wherein the polyester blend composition is substantially free of initiators.

19. A method according to claim 13, wherein the aliphatic ester polycondensate is synthesized from a dicarboxylic acid compound selected from the group consisting of compounds having the formula:

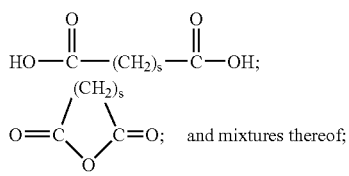
and mixtures thereof;

wherein s is from about 1 to about 10; and a dihydric alcohol having the formula: HO—(CH$_2$)$_t$—OH wherein t is from about 2 to about 10.

* * * * *